US010499001B2

(12) United States Patent
Van Geel et al.

(10) Patent No.: US 10,499,001 B2
(45) Date of Patent: Dec. 3, 2019

(54) SYSTEM AND METHOD FOR AUGMENTED VIDEO PRODUCTION WORKFLOW

(71) Applicant: GVBB HOLDINGS S.A.R.L., Luxembourg (LU)

(72) Inventors: Ronny Van Geel, Zegge (NL); Bart Van Dijk, Nuenen (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

(21) Appl. No.: 15/919,728

(22) Filed: Mar. 13, 2018

(65) Prior Publication Data
US 2018/0270441 A1 Sep. 20, 2018

Related U.S. Application Data

(60) Provisional application No. 62/472,466, filed on Mar. 16, 2017.

(51) Int. Cl.
*H04N 5/445* (2011.01)
*G06T 7/00* (2017.01)
(Continued)

(52) U.S. Cl.
CPC ....... *H04N 5/44504* (2013.01); *G02B 27/017* (2013.01); *G06T 7/97* (2017.01);
(Continued)

(58) Field of Classification Search
CPC ............ G02B 2027/0178; G02B 27/017; G06T 7/97; H04N 5/2228; H04N 5/2251;
(Continued)

(56) References Cited

U.S. PATENT DOCUMENTS 8,587,659 B1 * 11/2013 Socolinsky ........ H04N 5/23293
318/47
9,360,671 B1 * 6/2016 Zhou .................... G02B 27/017
(Continued)

FOREIGN PATENT DOCUMENTS

EP    1001618 A1   5/2000
GB    2292038 A    2/1996

OTHER PUBLICATIONS

International Search Report & Written Opinion issued in PCT/EP2018/056462 dated May 30, 2018.

*Primary Examiner* — Amy R Hsu
(74) *Attorney, Agent, or Firm* — Arent Fox LLP

(57) ABSTRACT

A system and method that recognizes and highlights objects in a video frame for augmented video production workflow. A video production camera is provided to capture a video frame and generate frame data and object data relating to objects within the video frame that are in focus. Moreover, a display device is included that is wearable by the camera operator and includes a camera that captures field of view data that corresponds to a field of view of the camera operator. Furthermore, the display device can compare the video frame data with the field of view data captured by the camera to generate visual indicators for the video frame and the in focus objects. As a result, the display device can provide the camera operator with a field of view having visual indicators of the video frame and the objects that appears as overlays over the operator's field of view.

20 Claims, 10 Drawing Sheets

(51) Int. Cl.
  *H04N 5/222* (2006.01)
  *H04N 5/232* (2006.01)
  *H04N 5/268* (2006.01)
  *H04N 5/44* (2011.01)
  *H04N 5/225* (2006.01)
  *H04N 5/247* (2006.01)
  *G02B 27/01* (2006.01)

(52) U.S. Cl.
  CPC ......... *H04N 5/2228* (2013.01); *H04N 5/2251* (2013.01); *H04N 5/23293* (2013.01); *H04N 5/247* (2013.01); *H04N 5/268* (2013.01); *H04N 5/4403* (2013.01); *G02B 2027/0178* (2013.01)

(58) Field of Classification Search
  CPC .... H04N 5/23293; H04N 5/247; H04N 5/268; H04N 5/4403; H04N 5/44504
  See application file for complete search history.

(56) References Cited

U.S. PATENT DOCUMENTS

| | | | |
|---|---|---|---|
| 2011/0074928 A1* | 3/2011 | Misawa | G06K 9/00295 348/47 |
| 2011/0181766 A1* | 7/2011 | Hashiguchi | H04N 5/222 348/333.12 |
| 2013/0342569 A1* | 12/2013 | Karkkainen | G02B 27/017 345/633 |
| 2014/0036076 A1* | 2/2014 | Nerayoff | H04N 7/181 348/148 |
| 2014/0294231 A1* | 10/2014 | Datta | G06T 7/251 382/103 |
| 2014/0300687 A1* | 10/2014 | Gillard | G06T 15/20 348/36 |
| 2016/0295118 A1* | 10/2016 | Tang | H04N 5/23293 |
| 2018/0063434 A1* | 3/2018 | Seol | H04N 5/247 |

* cited by examiner

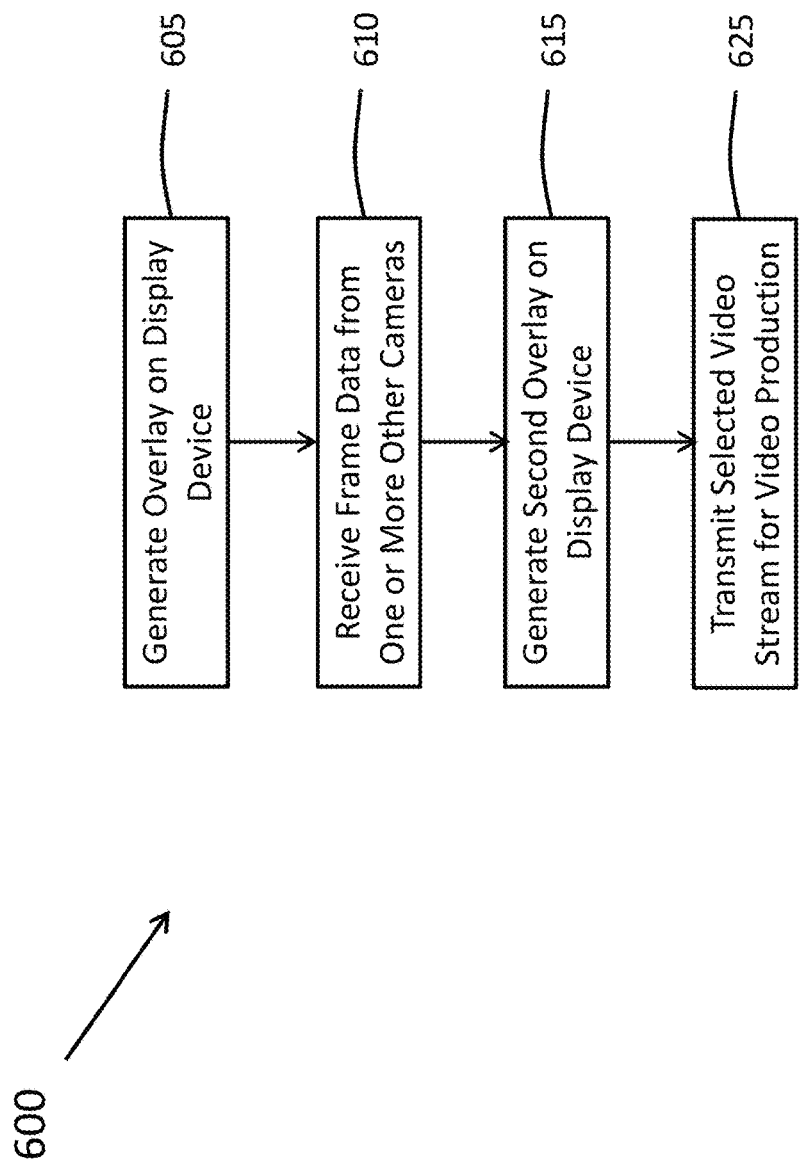

SYSTEM AND METHOD FOR AUGMENTED VIDEO PRODUCTION WORKFLOW

CROSS REFERENCE TO RELATED APPLICATIONS

The present application claims priority to U.S. Provisional Patent Application No. 62/472,466, filed Mar. 16, 2017, the entire contents of which are hereby incorporated by reference in their entirety.

TECHNICAL FIELD

The present disclosure generally relates to video data processing, and, more particularly, to a system and method for augmented video production workflow.

BACKGROUND

The production of a live or live-to-tape video show (such as a network news broadcast, sports broadcast, talk show, or the like) is largely a manual process that involves a team of specialized individuals that work together in a video production environment having a studio and a control room. The video production environment is comprised of many types of video production devices, such as video cameras, microphones, video tape recorders (VTRs), video switching devices, audio mixers, digital video effects devices, teleprompters, and video graphic overlay devices, and the like.

In the conventional production environment, most of the video production devices are manually operated by a production crew of artistic and technical personnel working together under the direction of a director. For example, a standard production crew can include camera operators, a video engineer who controls the camera control units for each camera, a teleprompter operator, a character generator operator, a lighting director who controls the studio lights, a technical director who controls the video switcher, an audio technician who controls an audio mixer, tape operator(s) who control(s) a bank of VTRs, and the like.

One of the first steps of video production for a show entails the capturing of video content by one or more camera operators. Specifically, each camera operator's task is to make the right or best "framing" of the shot (i.e., what is visible in the camera screen and what falls outside of the visible area of the camera) and to ensure that the right part of the framing is spot-on in focus. To judge both, the camera operator will typically use a so-called "viewfinder", which is usually a small monitor of the camera that shows the image to the camera operator as it is seen through the lens of the camera and viewed by the director. Using this relatively small display, the camera operator must judge the framing and the focus of the captured scene for the live or live-to-tape video shows.

Importantly, the viewfinder must provide a resolution that enables the camera operator to determine which objects (e.g., a person's face) are in focus for the captured frame. As such, current leaders in the industry have continually been developing viewfinder solutions that provide an image resolution that matches or exceeds the production format for the show. However, as video display technologies continue to develop to provide with the move to UHD ("ultra-high-definition"), 4 k and other initiatives, the physical limits are met of what the human eye of the camera operator can judge on a screen of this size. In other words, even if a camera viewfinder is developed with image resolution accordingly to these production formats, the camera operator will not be able to determine what objects are actually in focus for the captured video frames as the resolution surpasses the limits of the human eye on such small screens.

Accordingly, a solution is needed that enables a camera operator to frame shots for video production while also ensuring that the preferred object within the frame is spot-on in focus.

SUMMARY

Accordingly, the system and method disclosed herein eliminates the camera operator's need to judge where the captured image is in focus and instead actively tells the camera operator what objects are in focus with the captured frame. Thus, the system and method recognizes and highlights the objects, rather than enhancing the pixels with high-frequent information. The disclosed system and method can be implement using stand-alone as well as in a multi-camera production, where the camera operator has a unique free 360 degree view of the live scene being captured as video content.

Thus, according to an exemplary aspect, a system is provided for augmented video production workflow. In this aspect, the system includes a video production camera configured to capture a video frame and to generate video frame data and object identification data relating to at least one in focus object identified within the video frame. Moreover, the system includes a display device wearable by a user, the display device including a camera configured to capture a field of view data corresponding to a field of view of the user, a data image comparator configured compare the video frame data from the video production camera with the field of view data captured by the camera and generate a first visual indicator for the video frame and a second visual indicator for the identified at least one in focus object, an overlay generator configured to generate a first overlay for the first visual indicator for the video frame and a second overlay for the second visual indicator for the identified at least one in focus object, and a display having a clear lens enabling the user to see the field of view and configured to display the first and second overlays in the clear lens, such that the clear lens is configured to display the visual indicators of the video frame and the identified at least one in focus object that as the first and second overlays within the field of view of the user.

According to another exemplary aspect, the system can include an additional video production camera configured to capture an additional video frame of the at least one in focus object and transmit additional video frame data associated with the additional video frame to the display device. In this aspect, the data image comparator is further configured to compare the additional video frame data with the field of view data captured by the camera and generate an additional visual indicator for the additional video frame that is displayed as another overlay in the clear lens of the display device. Moreover, at least one of the display device and the camera includes an interface configured to receive a user input to select one of the video production camera and the additional video production camera to provide content captured by the selected video production camera for video production.

In an additional aspect, the overlay generator is further configured to generate the first overlay for the video frame captured by the video production camera and the second overlay for the identified at least one in focus object, such that the second overlay is displayed as a visual indicator within the first overlay.

Moreover, the display device of the exemplary system can be a pair of glasses wearable by the user, that includes a frames having a user field of view when worn by the user that corresponds to the field of view captured by the second camera.

In yet an additional aspect, the data image comparator is further configured compare the video frame data from the video production camera with the field of view data captured by the camera and to update a position for the first and second visual indicators in the clear lens upon detecting changes to any of the video frame data, the object identification data and the field of view data.

In another exemplary embodiment, a system is provided for augmented video production workflow. In this aspect, the system includes a first camera configured to capture a video frame and to generate video frame data corresponding to the captured video frame. Moreover, the system includes a display device wearable by a user, the display device including a second camera configured to capture a field of view data, a data image comparator configured to compare the video frame data generated by the first camera with the field of view data captured by the second camera, an overlay generator configured to generate a first visual indicator for the captured video frame based on the comparison between the video frame data and the field of view data; and a display configured to display the first visual indicator corresponding to the video frame captured by the first camera.

In yet another exemplary embodiment, a display device is provided for augmented media content capture. In this aspect, the display device includes a camera configured to generate field of view data corresponding to a field of view of a user wearing the display device; an overlay generator configured to generate a visual indicator for at least one video frame captured by a media content capture camera communicatively coupled to the display device; and a display including the field of view of the user and configured to display the generated visual indicator at least partially within the field of view of the user.

Moreover, in an exemplary aspect, the display device further includes a data image comparator configured to compare the generated field of view data with the at least one video frame captured by the media content capture camera. In this aspect, the overlay generator can be further configured to generate the visual indicator for the at least one video frame based on the comparison between the captured at least one video frame and the generated field of view data.

In another exemplary aspect, the display device is a pair of glasses wearable by the user, and the display includes at least one frame including the field of view when worn by the user that corresponds to the field of view captured by the camera.

Furthermore, in an exemplary aspect, the overlay generator of the display device is further configured to generate an object visual indicator for at least one in focus object at least one video frame within the at least one video frame. In this aspect, the overlay generator can be further configured to generate the visual indicator as a first overlay for the video frame captured by the media content capture and the object visual indicator as a second overlay for the identified at least one in focus object, such that the second overlay is displayed within the first overlay on the display of the display device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 illustrates a flowchart for a method for augmented video production workflow according to a refinement of the exemplary aspect.

DETAILED DESCRIPTION

Figure 1:
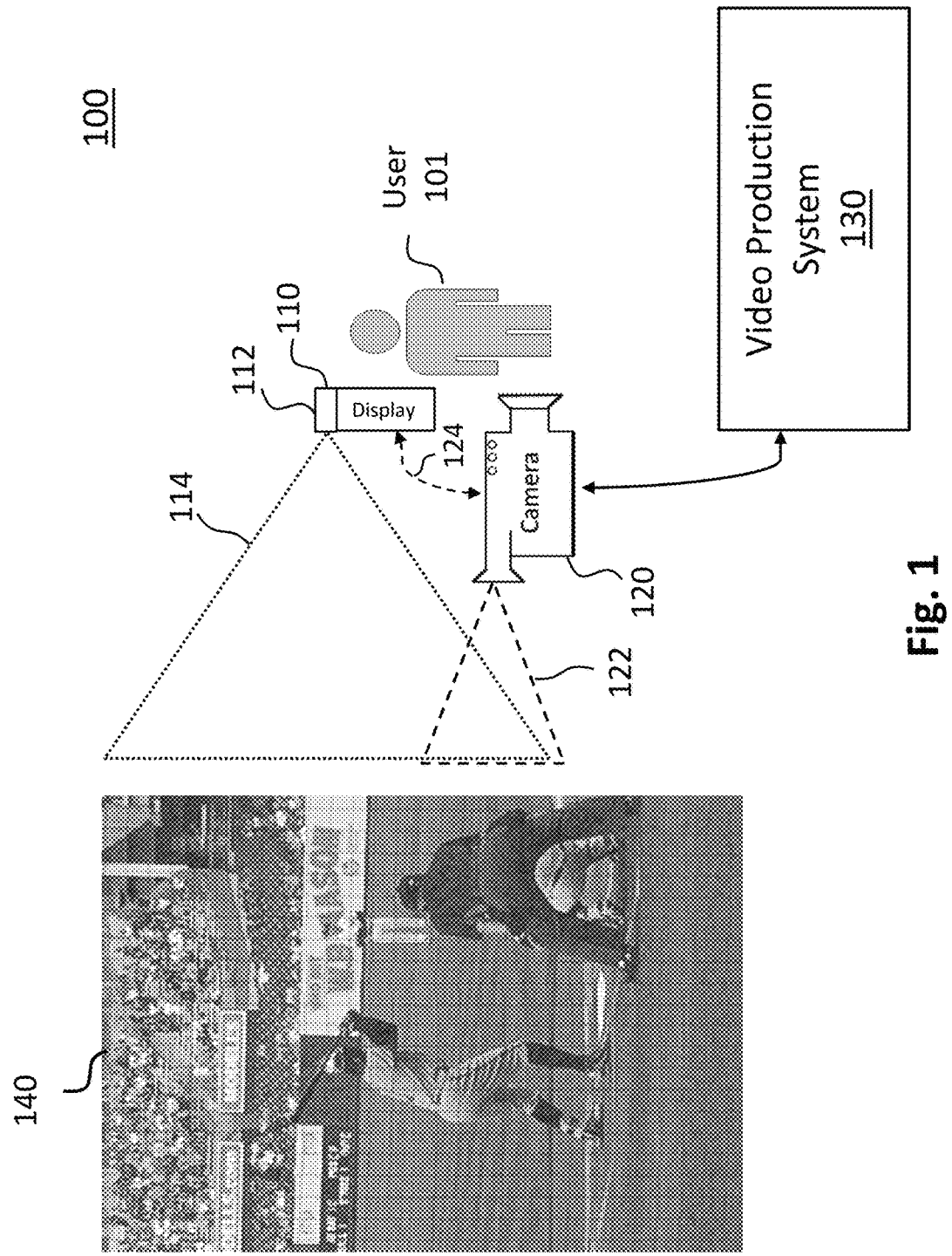
FIG. 1 illustrates a block diagram of a system for augmented video production workflow according to an exemplary aspect.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. For example, one or more of the components of system 100 described below may provide for such processing system. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

FIG. 1 illustrates a block diagram of a system for augmented video production workflow according to an exemplary aspect. In general, system 100 illustrates an example of the production stage in which the camera operator (i.e., user 101) is using camera 120 to capture video (i.e., a sequence of video frames) from a live scene 140. In this example, the live scene 140 can be a sporting event, such as a baseball game. However, it should be appreciated that the production environment can be used to capture any type of video image, such as a new cast, live television show, or various other types of television programming.

Moreover, camera 120 (also referred to as a "first camera" or "media content capture camera") can be any type of conventional video production camera configured to capture the video frames of the live scene 140. In one exemplary aspect, the camera 120 can be held by camera operator 101. In another exemplary aspect, the camera 120 can be a robotic camera assembly that includes a television camera. In either case, the camera 120 include video capture components, such as a zoom lens whose functions, such as iris and zoom, respond to signals supplied by a processor. In the case of a robotic camera assembly, the camera 120 may also control a robotic camera pedestal controlled by a processor that has the capability of displacing the camera along the X and Y axes as well as panning and tilting the camera responsive to signals from the processor. Thus, the processor operates to control the movement of the robotic camera pedestal as well as the functions of the lens in accordance with the video signal from the camera.

In addition, the production camera 120 includes components to perform autofocus functions of one or more objects (also referred to as "elements") in a captured frame. In particular, during video production, each production camera 120 will have a field of view 122 directed towards the live scene 140. Inevitably, within the live scene there will be specific important objects for the storytelling process, such as a baseball fielder's face in live scene 140, for example. Existing camera technologies include autofocus components and techniques that enable the production camera to identify such objects and adjust the zoom levels, etc., to focus in on these objects. For example, the camera will analyze the pixel array to determine a high frequency, high delta between two adjacent pixels in the array, which will indicate that the specific object must be "in focus". There are many existing camera technologies that provide autofocus features and will not be described in detail herein. However, according to the exemplary aspect, camera 120 is configured to generate data (e.g., "object identification data") corresponding to the identification of in focus objects that effectively identifies (by a framing of the object, for example) that the object is actually in focus. As described in detail below, this information can be presented to the camera operator 101.

According to the exemplary aspect, the camera operator 101 is provided with and can wear a display device 110, which can be a "heads-up display", such as "Google Glass" device or the like. For example, the display device 110 can be a wearable set of glasses or similar headset that includes a clear lens that enables the camera operator 101 to clearly see the live scene 140 without any obstructions or limitations on the field of view. It should be appreciated that the clear lens will correspond to the field of view of the user as described herein. Thus, while a viewfinder of a conventional video camera is limited in that the field of view shown on the viewfinder corresponds to the captured frame of the camera, the display device 110 according to the exemplary aspect includes a clear lens that enables the camera operator 101 to freely see the live scene 140.

According to the exemplary aspect, the display device 110 can include three primary components: a projector unit, a combiner, and a video generation computer. These components are known to those skilled in the art and are not shown in detail in FIG. 1 so as to no unnecessarily obscure the aspects of the invention. However, in general, the projection unit is an optical collimator setup that includes a convex lens or concave mirror with a Cathode Ray Tube, light emitting diode, or liquid crystal display at its focus. This setup produces an image where the light is collimated, i.e. the focal point is perceived to be at infinity. Moreover, the combiner can be an angled flat piece of glass (i.e., a beam splitter) that is located directly in front of the viewer and that redirects the projected image from the projection unit in such a way as to see the field of view and the projected infinity image at the same time. In one aspect, the combiner may have special coatings that reflect the monochromatic light projected onto it from the projector unit while allowing all other wavelengths of light to pass through. Moreover, the display device 110 also includes a processing unit (i.e., the video generation computer) that provides the interface between the projection unit and the systems/data (i.e., the camera 120) and generates the data be displayed by the projection unit, as will be discussed in detail below.

As further shown in FIG. 1, the display device 110 is communicatively coupled to camera 120 as indicated by dashed arrow 124. According to the exemplary aspect, the communication between the components can be implemented by a wired connection (e.g., an HDMI or DVI cable or the like) or alternatively using a wireless data communication technologies, such as Bluetooth communication protocols, WiFi communication or the like. In either case, the camera 120 is configured to transmit data relating to the captured video images that includes both data relating to the captured frame and the in-focus one or more objects within the frame.

Moreover, according to the exemplary aspect, the display device 110 includes its own image camera 112 (also referred to as a "second camera") that is able to capture the live scene 140 from the camera operator's perspective, viewing angle, etc. Preferably, the camera 112 of the display device 110 is mounted as close as possible to the camera operator's eye point (i.e., the operator's point of view). In this regard, the camera 112 is able to capture a field of view 114 that corresponds to the field of view of the actual camera operator 101. Moreover, in the exemplary aspect, the display device 110 is capable of determining its position (including the field of view 114, angle, etc.) relative to space, including the live scene 140. As will be described in detail below, this enables the display device 110 to generate an overlay of the field of view of the camera that is very accurate, which is important since this overlay enables the camera operator to decide whether the framing of the image is acceptable for the video production.

As further shown, camera 120 has a field of view 122 that will correspond to the "framing" (i.e., the video image captured by camera 120). As described above, the frame captured by the camera 120 will be relatively small and with conventional systems displays a correspondingly small image on a viewfinder. In contrast, the field of view 114 captured by camera 112 of the display device 110 corresponds to the field of view of the actual camera operator 101, who is no longer forced to observe the captured frame within the viewfinder during image capture.

In this regard, the camera 120 transmits data correspond to the captured frame and in-focus element(s)/object(s) as described above. In the exemplary aspect, the field of view 122 captured by frame data provided by camera 120 (as generated video frame data) will at least partially overlap with the field of view 114 captured by camera 112, as long as the camera operator 101 is generally looking in the same direction, i.e., at live scene 140 with an overlap of the two fields of view, as the image capture direction of the lens of camera 120. Thus, according to the exemplary aspect, the processor (discussed below) of display device 110 is configured to compare the frame data from camera 120 with the captured data from the field of view of 114 of camera 112.

According to the exemplary aspect, using conventional image recognition techniques, the processor of camera 112 can determine whether the frame data for camera 120 overlaps with the camera operator's field of view 114 (e.g., on a pixel by pixel basis) and, upon detection of overlapping portions of the image data, the processor of camera 112 can generate overlay data to be presented to the camera operator 101. Alternatively, the processor of the display device 110 can receive the frame data from camera 120 and determine whether it overlaps with the camera operator's field of view 114 in order to generate the overlay data to be presented to the camera operator 101.

In either case, this overlay data will effectively provide a framing of the camera 120 that is presented as an overlay using display device 110. In other words, the processor of camera 120 is configured to generate a digital rectangle that will be overlaid in the field of view of the display device 110. Moreover, the generated digital rectangle will preferably have an aspect ratio that matches the frame data captured by camera 120, where the digital rectangle, for example, is presented to the camera operator as a visual display that is "hovering" in the air, to indicate the area that is framed by the camera 120 for the director. It should be appreciated that as the camera 120 is controlled to zoom in, the rectangle will become smaller, whereas the rectangle will become larger if the camera is zoomed out. Moreover, if the filming direction (i.e., field of view 122) of camera 120 is adjusted, the rectangle overlaid by display device 110 to the camera operator 101 will move in a corresponding and relative manner (assuming the camera operator does not change his field of view 114 in the same direction as camera 120).

As further described above, the camera 120 includes auto-focus features that enable the camera 120 to detect objects within its framing that are in focus. This information can also be transmitted from camera 120 to display device 110, which in a similar manner to the overlay frame data described above, can also display an outline (e.g., a rectangle or circle) around the in-focus object(s), such as a person's face. The exemplary system enables the camera operator 101 to see the real world (i.e., the live scene 14), with an overlay of information "projected" on the real world view, such as the field of view 114. Moreover, the resolution of the overlay can be a fraction of the resolution of the production format and is not critical from the perspective of the camera operator. Thus, the exemplary aspect is not provided to enhance individual pixels, but rather to indicate to the camera operator 101 of the captured framing of the camera 120 within the operator's field of view 114 and which elements are in focus within the frame (i.e., field of view 122) captured by the camera 120.

Thus, according to an exemplary aspect, if a face of a person is in focus, the edge of that person's face will be emphasized by overlaying a line or a similar type of visual indicator. As the camera operator 101 turns his or her head, the visual indicator remains on top of the real-life person within the live scene 140 (i.e., the visual indicator moves relative to the field of view 114, but remains fixed on the detected object. The combination of displaying the framing and indicating the elements/objects in the frame that are in focus provides the necessary information for the camera operator 101 to do her/his job by knowing which items within the frame are in focus, where the operator otherwise could not be identified using a conventional viewfinder with high resolution. Moreover, the field of view of the camera operator 101 will not be limited by a viewfinder since the camera operator 101 is not forced to use the viewfinder at all and is instead presented with the overlay information (i.e., framing and in focus objects) as visual overlays in the field of view 114 of the display device 110.

Figure 2A:
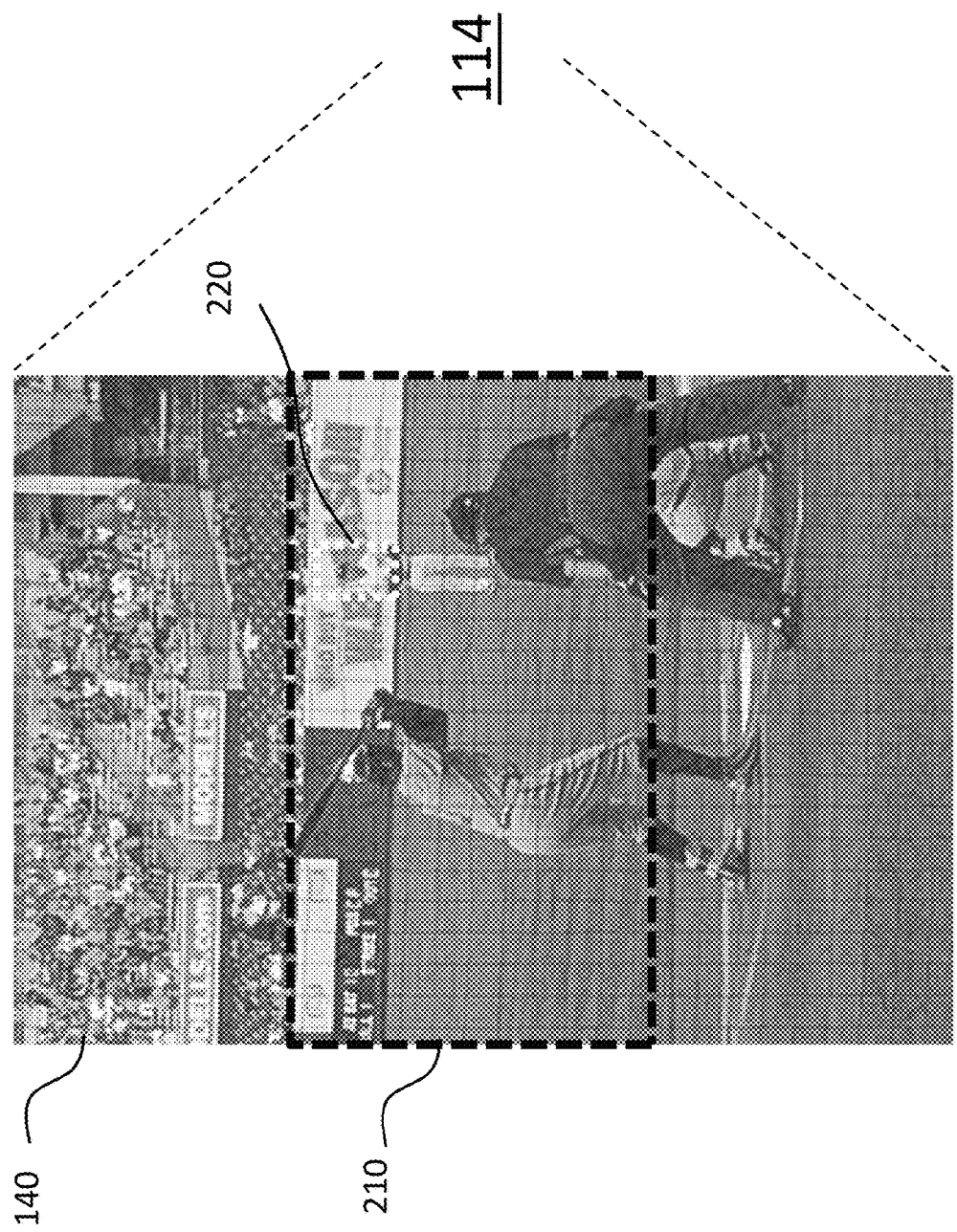
FIGS. 2A-C illustrate exemplary displays presented to a camera operator for the augmented video production workflow according to an exemplary aspect.

FIG. 2A illustrates an exemplary display presented to a camera operator for the augmented video production workflow according to an exemplary aspect. As shown, the field of view 114 substantially corresponds to the field of view for the camera operator 101 as described above. As further described above, the camera 120 is configured to capture a frame and transmit the video frame data and preferably along with data indicating in focus objects (i.e., object identification data) to the display device 110. The processor of the display device 110 is configured to compare the received data with image data captured by its camera 112. According to the processing described above, the display device 110 is configured to generate an overlay (indicated by dashed rectangle 210, for example) that is presented as a visual indicator in the field of view 114 (or at least partially in the field of view 114) of the camera operator 101. For example, in the exemplary aspect, the framing can be indicated by a first visual indicator, such as a highlighted or dashed digital frame over the real world view of the operator. In other words, the processor of the display device (e.g., an overlay generator) can generate the first visual indicator as a first overlay 210 for the video frame captured by the video production camera and a second visual indicator as a second overlay 220 for the identified one or more in focus objects, such that the second overlay 220 is displayed as a visual indicator within the first overlay 210, or partially within the first overlay according to an exemplary aspect.

Similarly, one or more in focus elements/objects can be identified by camera 120 using the autofocus features described above and corresponding data can be transmitted to display device 110. These in focus elements/objects will be identified to the camera operator 101 by a second visual indicator 220, which can also be a highlighted or dashed digital rectangle over the real world view. The second visual indicator 220 (e.g., another digital rectangle) indicating the one or more in focus elements/objects will necessarily be within the large first visual indicator 210 that indicates the framing of the captured image. It also should be appreciated that while dashed visual rectangles are used as the indicator to display the framing and in focus object(s) according to the exemplary aspect, other visual indicators, such as highlighted portions of the field of view 114 of the display device 110 can be used according to alternative aspects as would be appreciated to one skilled in the art.

Advantageously, it should be appreciated that the exemplary system provides the camera operator 101 with a free view of the live scene 140 as compared to the specific framing direction of the camera 120. Using conventional systems as described above, the camera operator's view is partly blocked, either by a big viewfinder in front of her/him, or by the ocular viewfinder and the camera body on the operator's shoulder. In addition, the viewfinder only shows the current framing and does not show the portions of the scene that are outside of the frame. The exemplary system disclosed herein enables the operator to play a much more efficient role in the production process because she/he can look around freely, enabling the operator to be far more effective in anticipating the next event in a studio production, sporting event, or the like, for example.

Figure 2B:
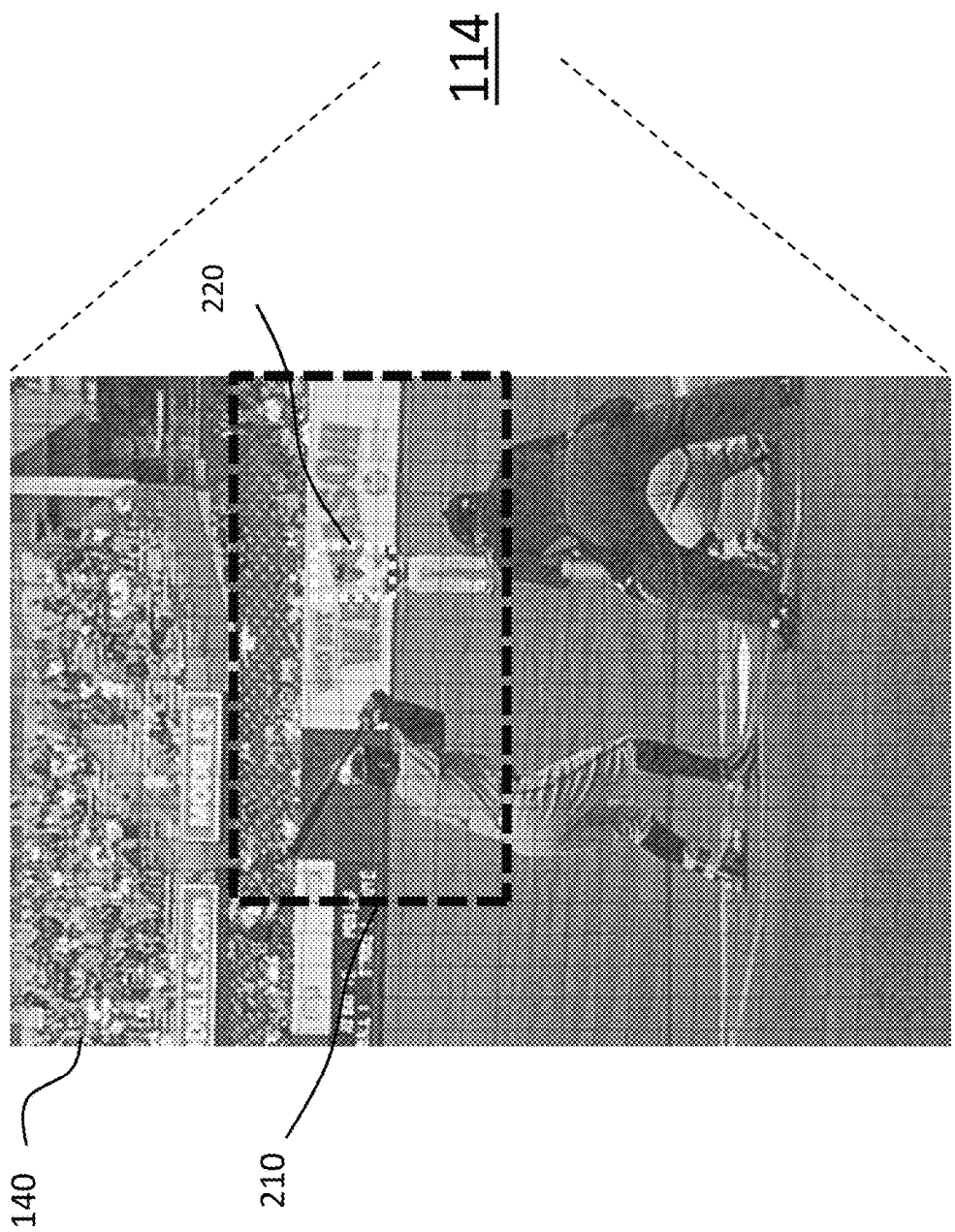

FIG. 2B illustrates another exemplary display presented to a camera operator for the augmented video production workflow according to an exemplary aspect. In this instance, it is assumed that the camera operator 101 has not moved his/her viewing position and that his/her field of view 114 is the same (or substantially the same) as shown above in FIG. 2A. However, in this instance, the content capture (i.e., filming) direction of the camera 120 has moved up in the Y axis and to the right in the X axis. Moreover, the lens of the camera 120 has been controlled to zoom in on the baseball fielder of the live scene 140. As described above, the movement and zooming functions can be in response to a camera control instruction received from the camera operator 101 or a director, for example. Comparing the two images of FIGS. 2A and 2B, the first visual indicator 210 has moved up and the rectangle as become smaller, which corresponds to the fact that the camera lens has zoomed in for the image capture. It should be appreciated that camera operator 101 still has the same field of view 114, but that the visual indicator 210 has moved within his field of view 114. Thus, the operator ill easily be aware of the change in camera image capture angle and zoom level.

Accordingly, it should be appreciated that the processor of the display device 110 is configured to continuously receive the video frame data and object identification data from the video production camera and compare this date with the field of view data captured by camera 112 (e.g., a continuous loop). As a result, the display device 110 can dynamically adjust the position of the visual indicators (e.g., corresponding to the captured video frame and the identified one or more in focus objects) as either the video production camera 120 or the camera 112 moves, zooms in or out, or the like, to change its respective perspective for the video content capture and/or field of view.

Figure 2C:
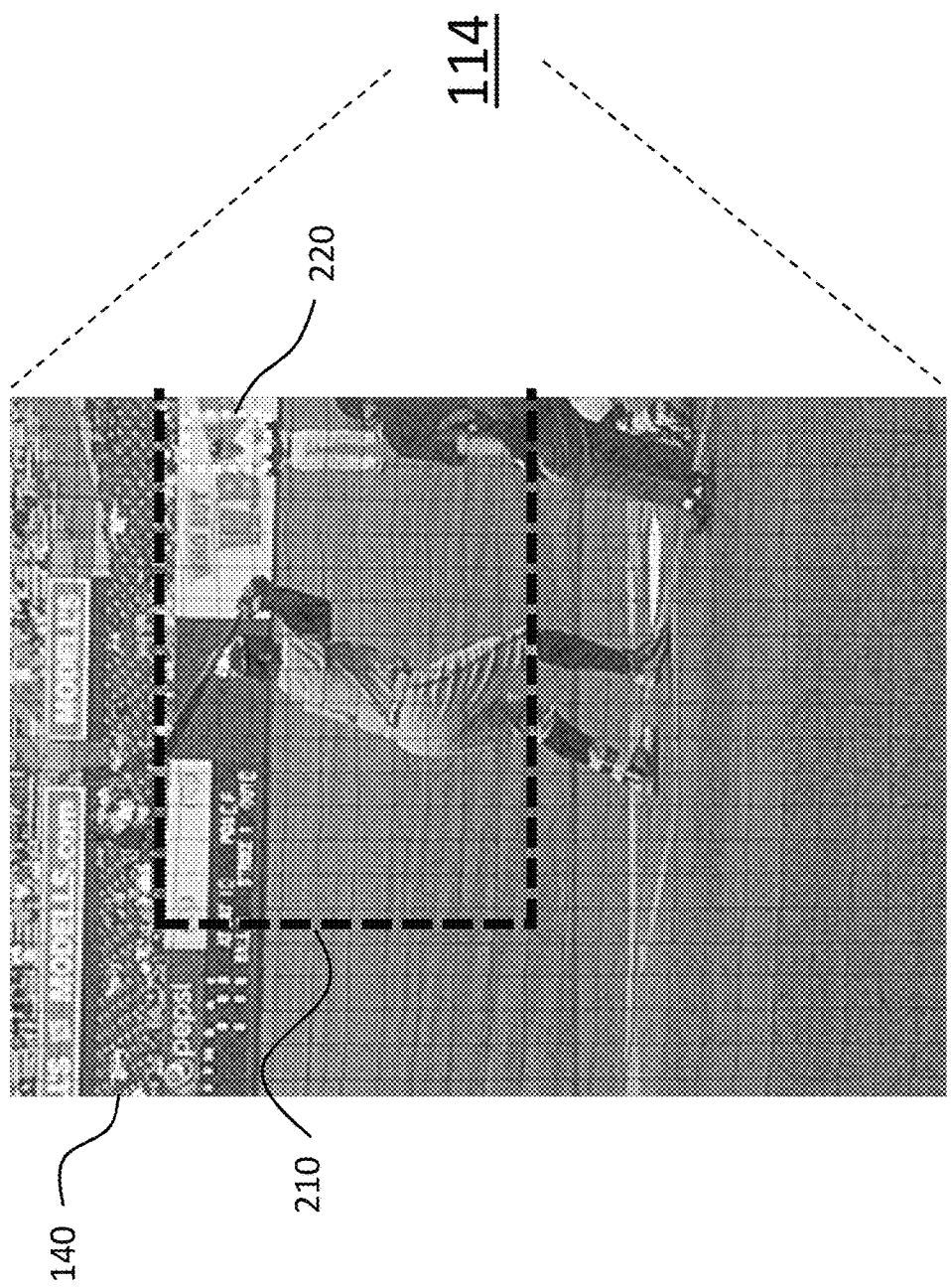

FIG. 2C illustrates another exemplary display presented to a camera operator for the augmented video production workflow according to an exemplary aspect. In this instance, the camera operator 101 has changed his field of view 114 by moving his viewpoint down and to the right of the live scene 140. However, the filming direction of the camera 120 has not changed from the direction or zoom level as shown above with respect to FIG. 2A. Thus, while the camera operator's field of view 114 has changed, the first visual indicator 210 and second visual indicator 220 have not changed positions with respect to the live scene 140. As a result, as the field of view 114 captured by camera 112 changes while the operator is moving his head, the processor of the display device 110 is configured to compare the captured image data with that received from camera 120 to continually move the visual indicators 210 and 220 relative to the operators view point.

In addition, according to the exemplary aspect, it is possible that the framing of the camera 120 does not completely fit with the operator's field of view 114. In this regard, the framing shown by visual indicator 210 may extend past the right side of the field of view 114. Thus, the visual indicator 210 may be modified to indicate to the operator that the framing is not entirely within his or her field of view 114. Thus, in this example, the visual indicator 210 is cut off on the right side, such that the dashed visual depiction does not include a right side. Moreover, other visual indicators can be provided to the camera operator 101 as would be appreciated to one skilled in the art.

Referring back to FIG. 1, system 100 also is generally shown to include a video production system 130. As described above, the camera operator 101 is provided with framing and in focus elements and objects captured by camera 120 and is able to freely move the camera based on this information to change the framing angle, for example, to effectively enhance the storytelling aspects of the show based on the camera operator's artistic influence. The captured video contents is also transmitted from camera 120 to the video production system 130 for processing and production of the show. For purposes of this disclosure, it is noted that the video production system 130 can use well known components for a video production environment, such as video switching devices, audio mixers, digital video effects devices, teleprompters, and video graphic overlay devices, and the like, as described above. Thus, it is assumed that all of these components can be included in the video production system 130 and can be considered "downstream" of the capturing of video content by camera 120. For example, in one exemplary aspect, the video production system 130 is similar to that described in U.S. Pat. No. 6,452,612 entitled "Real Time Video Production System and Method," and issued on Sep. 17, 2002, the entire contents of which are hereby incorporated by reference. Although in an alternative aspect, it should be appreciated that the system and method described herein can implement using any production system providing the processing and distribution functionality for a show as would be appreciated to one skilled in the art.

Figure 3A:
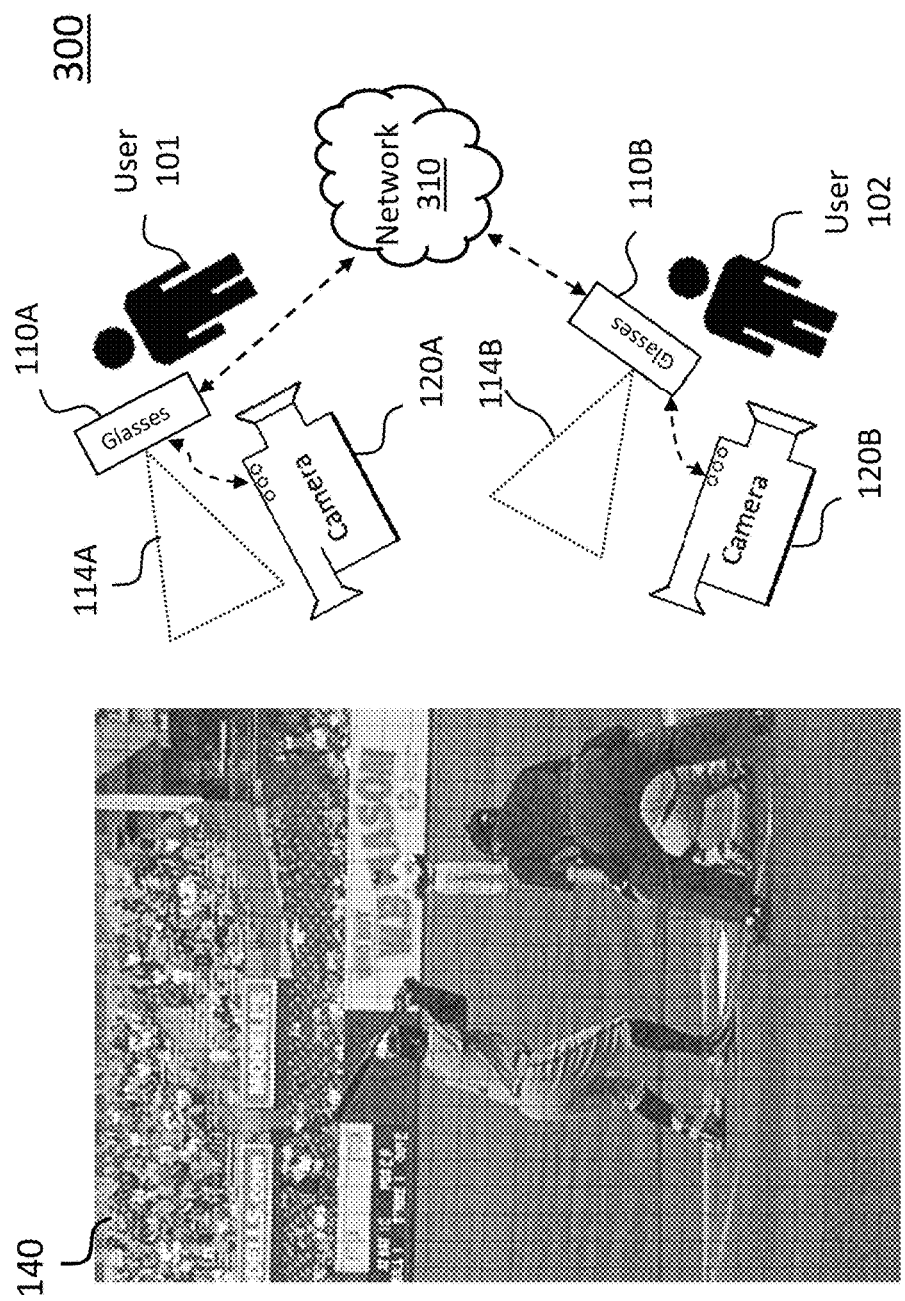
FIG. 3A illustrates a block diagram of a system for augmented video production workflow according to an alternative exemplary aspect.

FIG. 3A illustrates a block diagram of a system for augmented video production workflow according to an alternative exemplary aspect. In general as described above, the production environment for a live or live-to-tape video show will typically include a production crew with multiple camera operators working together. Thus, utilizing the exemplary aspects described above, the system 300 can also be provided with multiple camera operators, i.e., users 101 and 102. Although two operators are shown, it should be appreciated that more than two operators can included in the production crew. Alternatively, there may be only one camera operator and multiple cameras positioned at different locations relative to the live scene, such as the many cameras using on fields, at racetracks, etc., in sporting events, for example.

In the exemplary aspect, user 101 can be provided with a display device 110A (e.g., display glasses) with a corresponding field of view 114A and a production camera 120A that is provided to capture video frames of a live scene 140. Similarly, user 102 can be provided with a display device 110B (e.g., display glasses) with a corresponding field of view 114B and a production camera 120B that is provided to capture video frames of a live scene 140, but from a different angle/position than camera 120A, which is typically the case for a production environment.

In this regard, each camera operator 101 and 102 has a different field of view 114A and 114B, and their corresponding cameras 120A and 120B also capture different frames for the live scene since they are capturing video frames at different viewing angles, positions and the like. Advantageously, the exemplary system 300 can improve the artistic freedom and storytelling aspects of the video production. More particularly, the "storytelling" of a video production depends on how the various camera positions and framings overlap and complement each other.

With conventional systems, this judgment is based on (briefly) displaying the other camera's output signal on the viewfinder of another camera operator and/or instructions coming from the control room by a director, for example. However, such conventional systems provide only a very limited overview of the total amount of information that could be made available. Moreover, the process becomes significantly more difficult to manage as the number of cameras involved in the production environment increases. According to the exemplary system 300, the display devices 110A and 110B of each camera operator will not only frame his or her own respective camera, but can also frame other cameras in the same area.

In one exemplary aspect, the displays 110A and 110B are communicatively coupled to one another via a network 310, although they could be coupled directly in an alternative aspect. Thus, for example, network 310 can be any network for communicating data and data operations and can include a communication system (not shown) that connects the various computers of the system by wired and/or wireless links facilitated by various types of well-known network elements, such as hubs, switches, routers, and the like. In addition, network 310 may employ various well-known protocols to communicate information amongst the network resources. In one aspect, the network 310 can be part of the Internet or intranet using various communications infrastructure such as Ethernet, WiFi and the like. In a refinement of this aspect, the network 310 can be simply utilize Bluetooth communication assuming the displays 110A and 110B are in sufficient communication range with one another.

In any event, each camera is configured to transmit both its framing data and data indicating the in focus elements/objects to each other display of which it is communicatively coupled and forms part of the production environment. In this regard, another visual indicator indicating the other camera's framing and/or in focus elements/objects can be presented to the user by his or her respective display device (e.g., glasses). It should be appreciated that such visual indicators can be generated and presented using the same or similar techniques as described above.

Figure 3B:
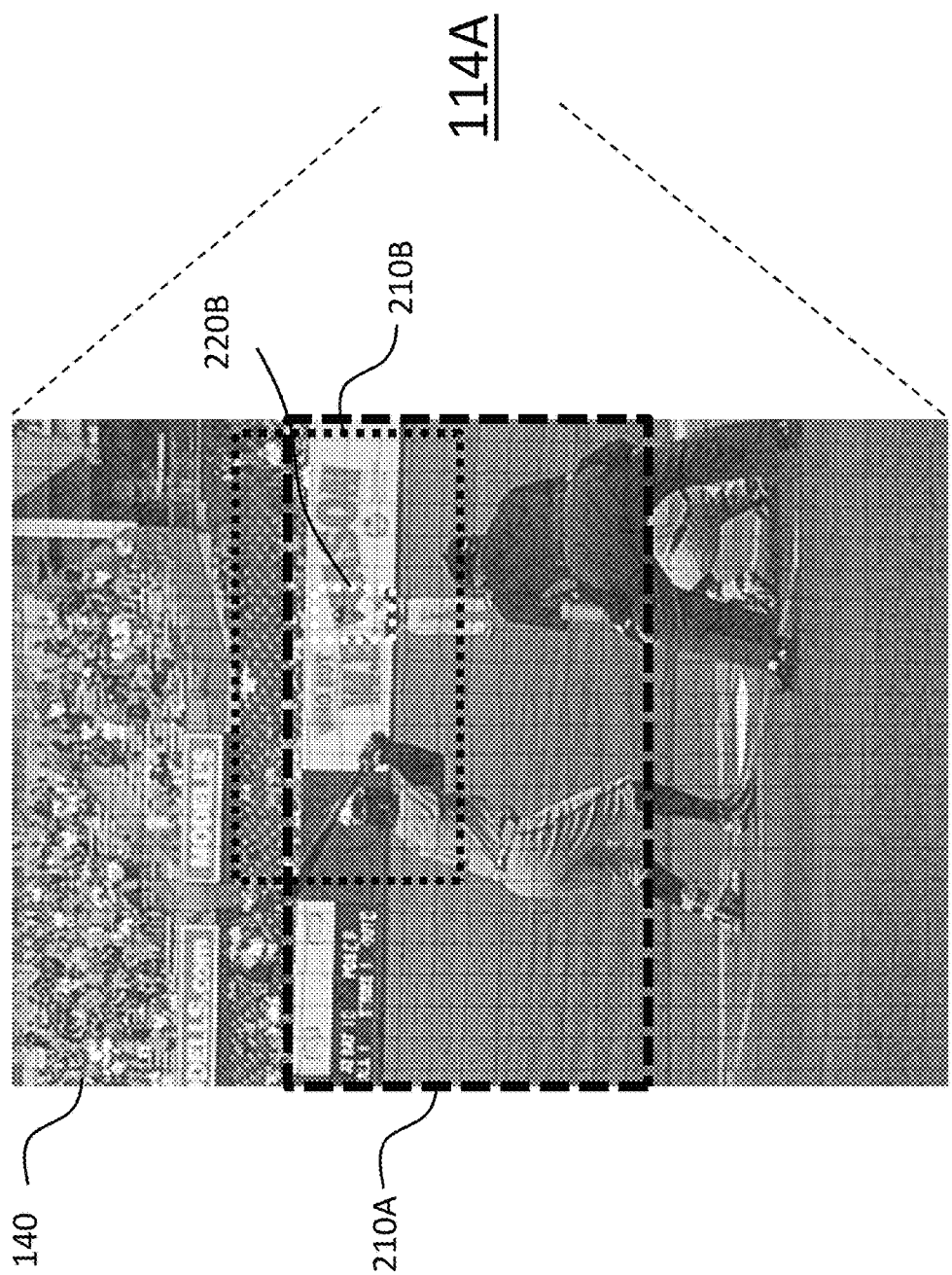
FIG. 3B illustrates an exemplary display presented to a camera operator for the augmented video production workflow according to the exemplary aspect of FIG. 3A.

FIG. 3B illustrates an exemplary display presented to a camera operator for the augmented video production workflow according to the exemplary aspect of FIG. 3A. In particular, this display can correspond to the visual presentation provided on display device 110A for user 101. In this regard, the user has a field of view 114A and is presented with a visual indicator 210A indicating the framing captured by his or her camera 120A. However, in addition, the display device 110A can receive framing and in focus element/object data from the display device 110B of user 102. In this regard, additional visual indicators 210B and 220B may be presented to the user 101 using similar techniques as described above. The visual indicator 210B can correspond to the framing of camera 120B and the visual indicator 220B can correspond to the in focus object. In this regard, the visual indicator 220B provides a small rectangle from camera 120B to be viewed by user 101 and indicates that camera 120B already covered a close-up of the fielder's face, according to the example. As a result, the camera operator 101 can easily judge which framing and focus will give the most added value to the director, and therefore, the camera operator 101 can choose the best possible framing and focus to add to the story (i.e., the production of the visual scene 140). For example, camera 120B may be a remotely controlled camera. Then, based on which camera 120A or 120B provides the best framing of the live scene, the camera operator 101 can select (e.g., by sending a control signal to the selected camera either by a user interface on the camera 120A and/or on the display device 110A via network 310) that causes the selected camera to transmit the captured video stream to a video production control center for video production, as will be discussed in more detail below.

Figure 4:
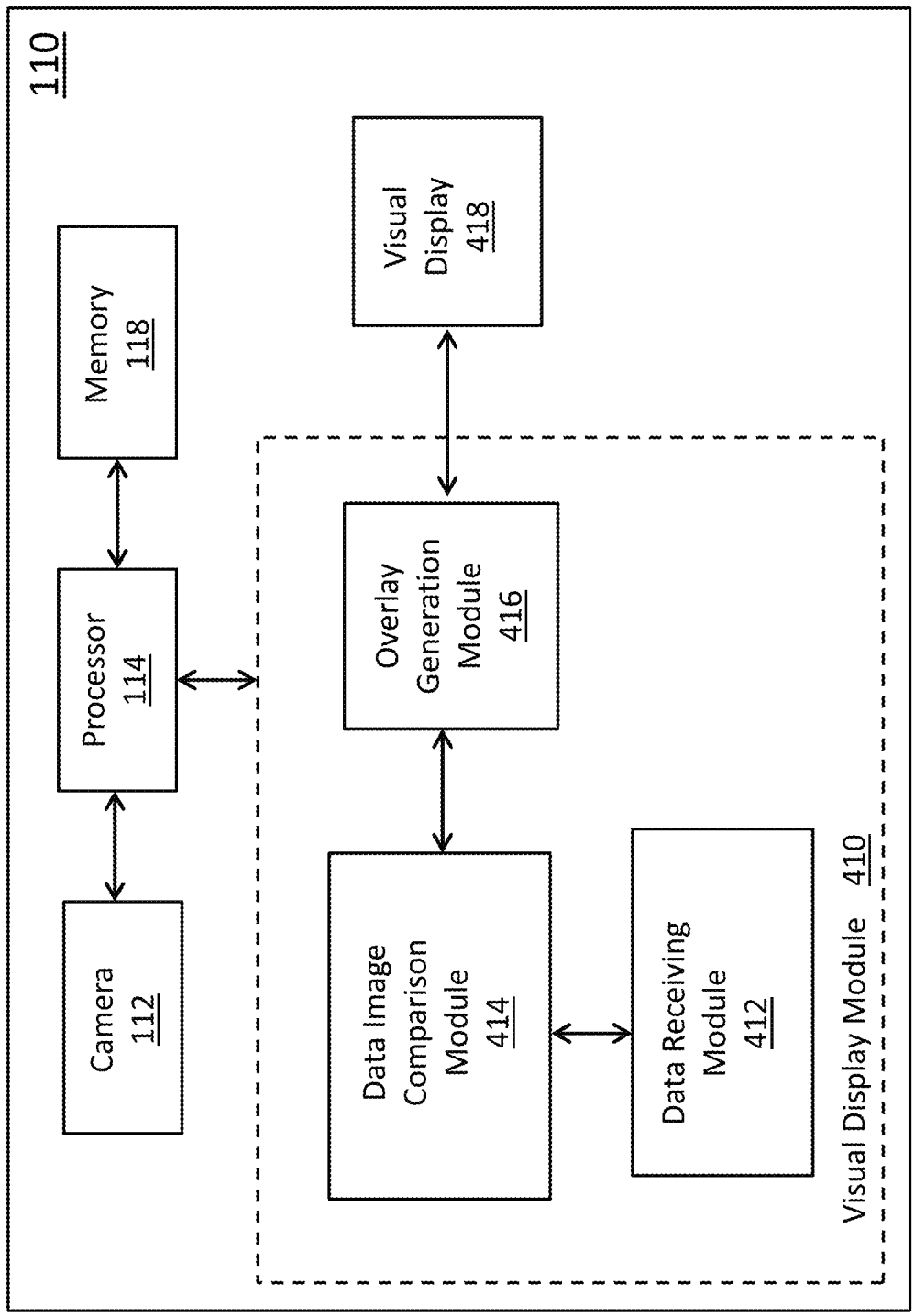
FIG. 4 illustrates a block diagram of a display device for augmented video production workflow according to an exemplary aspect.

FIG. 4 illustrates a block diagram of a display device for augmented video production workflow according to an alternative exemplary aspect. As described above, the display device 110 can be "heads-up display" or headset, such as "Google Glass" according to an exemplary aspect. Thus, according to the exemplary aspect, the display device 110 can include camera 112, a processor 114 and memory 118, which can be a data buffer or other electronic memory, for example, configured to store image data captured by camera 112. Moreover, the processor 114 is provided to execute computing operations, including execution of visual display module 410.

In general, visual display module 410 is configured to receive the camera data and create one or more visual indicators that are presented to camera operator using the visual display 418 (i.e., the displayed devices, such as clear lenses/display), as described in detail above. Moreover, in the exemplary aspect, visual display module 410 includes a plurality of sub-modules configured to perform the algorithms disclosed herein. Each of these modules can be considered a single collective module or separate software modules, with the modules each including software code (e.g., processor executable instructions) in the memory 118 of the display device 110. In general, the term "module" as used herein can refer to a software service or application executed by the processor 114, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor 114. Each module can be realized in a variety of suitable configurations, and should not be limited to any example implementation described herein.

Thus, as shown visual display module 140 includes data receiving module 412, which receives the framing and in focus elements/object data from the one or more cameras in the production environment as described above. Moreover, visual display module 140 includes a data image comparison module 414 (e.g., a data image comparator) that is configured to compare the image data (i.e., the generated video frame data and/or object identification data) generated by camera 112 with the framing data received from the video production camera (e.g., camera 120). For example, the comparison can be performed on a pixel by pixel basis to determine whether the frame captured by the camera 120 is within the field of view 114 captured by the camera 112 of the display device 110. In addition, the data image comparison module 414 can also identify whether the in focus element/object is within the field of view 114, using the object identification data, for example. If the frame and in focus object are identified in the image data captured by camera 112, the overlay generation module 416 (e.g., an overlay generator) is configured to generate a visual indicator (e.g., visual overlays) of each item as described above, which can then be presented to the operator on the visual display 418, such as the clear lens, as respective overlays, for example.

Advantageously, the display device 110 provide a plurality of visual indicators to the camera operator that enables him or her to judge framing and focus, regardless of the production resolution, while adding total freedom to look around for interesting elements to tell the story. In addition, because the visual display 418 can provide a visual indicator for other cameras in the production environment, the system provides a robust technique to make multi-camera productions much more efficient and at a higher quality level from a story-telling perspective.

Figure 5A:
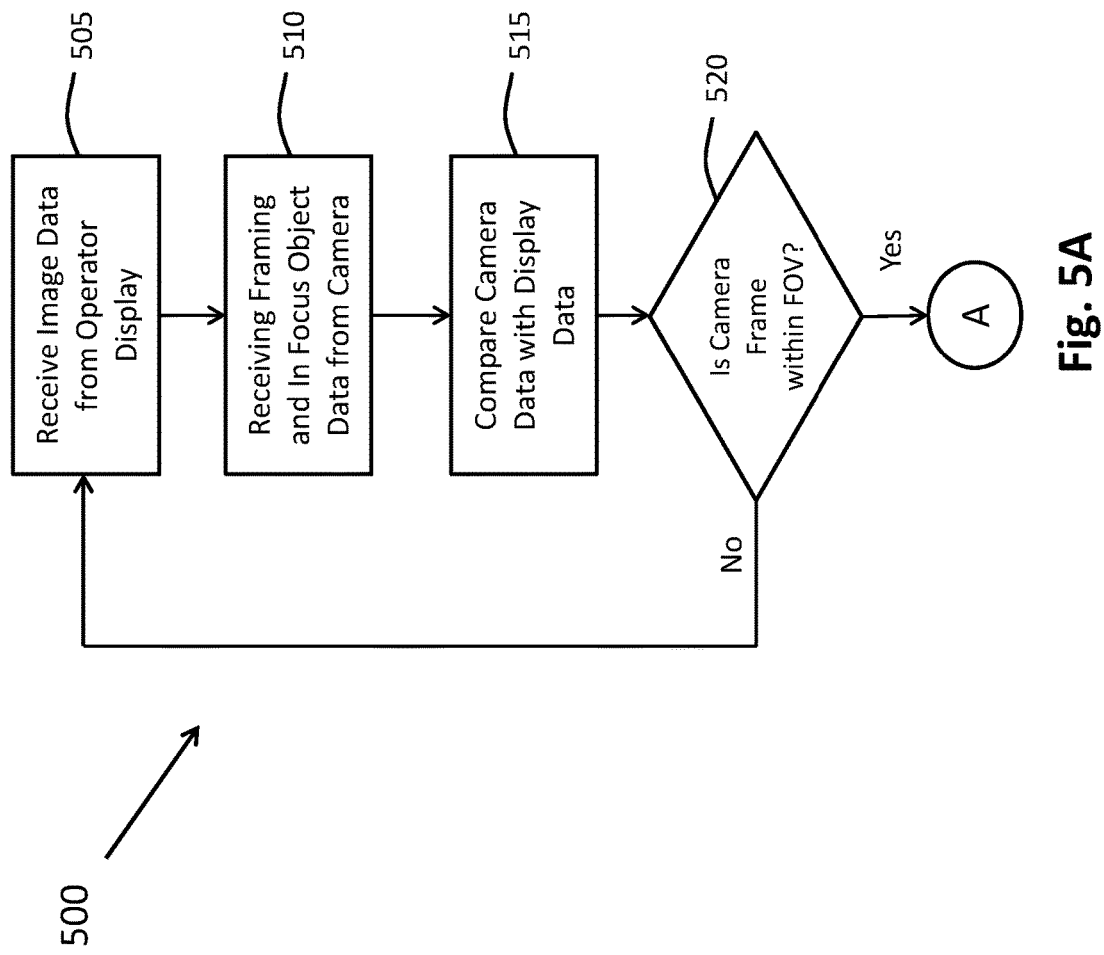
FIGS. 5A and 5B illustrate a flowchart for a method for augmented video production workflow according to an exemplary aspect.
Figure 5B:
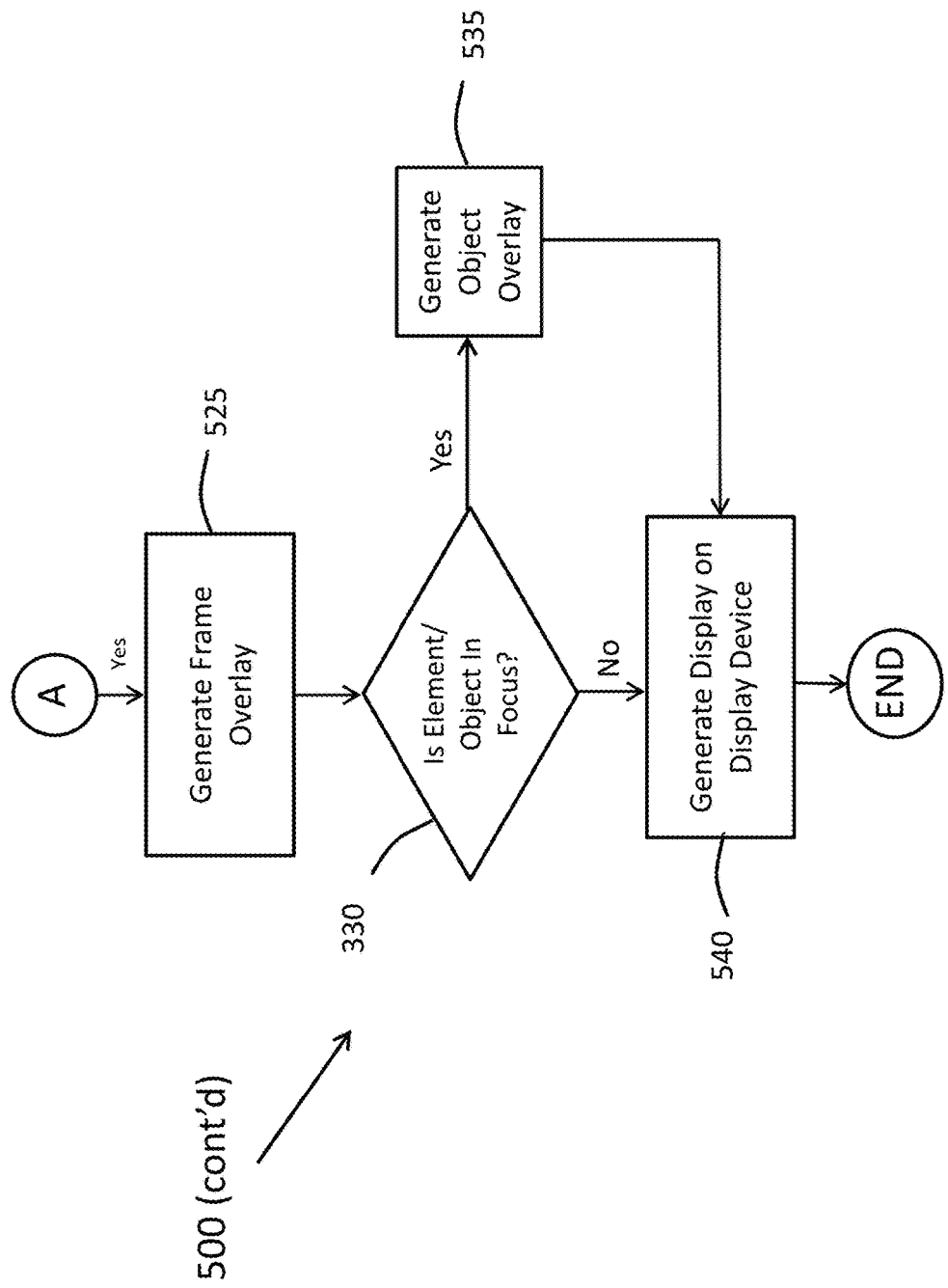

FIGS. 5A and 5B illustrates a flowchart for a method for augmented video production workflow according to an exemplary aspect. It is noted that the exemplary method can be implemented using the systems described above. Thus, the following description will make reference to the components of the exemplary system.

As shown, initially at step 505, the display device 110 of a camera operator 101 is configured to capture image data using a camera 112 attached to the display device 110. Presumably, the captured image data substantially corresponds to the field of view 114 of the camera operator. Next, at step 510 (which can be performed concurrently with step 505 in one aspect), the processing unit 114 of the display device 110 receives framing and in focus element/object data from a production camera 120 that the camera operator 101 is using to capture a live scene, for example. At step 515, the captured data from camera 112 is compare with the framing data from camera 120. As described above, this process is to determine whether the camera 120's frame is within the field of view of the camera 112. Thus, at step 520, the processing unit 114 of the display device 110 determines whether at least a portion of the frame is within the field of view 114. This comparison process can be performed by data image comparison module 414 using conventional image comparison techniques, such as a pixel by pixel comparison, for example. Moreover, while this processing is described as being performed by the processing unit of the display device 110, it should be appreciated that processing can be performed by another device (such as a separate computer communicative coupled to the display device) according to an alternative aspect.

If the camera framing is not within the field of view ("FOV") as determined at step 520, the process will return to step 505 and steps 505-520 will be performed as a continuous loop, according to one aspect. Alternatively, if the camera framing is within the field of view as determined at step 520, the method proceeds to step 525 where overlay generation module 416 can generate a digital overlay (e.g., visual indicator 210) to be presented to the user by display device 110. Subsequently (or concurrently), the method also performs step 530 where the processing unit 114 of display device 110 can determine whether it has received data from camera 120 indicating whether one or more elements/objects within the image frame have been identified to be in focus. If yes, the overlay generation module 416 can also generate a second visual indicator (e.g., visual indicator 210) at step 535. If no, the method proceeds directly to step 540. In either case, the one or more visual indicators can be presented to the operator 101 using display device 110 by visual display 418, for example. The method is shown to end at this point, but it is contemplated that the disclosed method can be performed on a continuous loop. Thus, as either the camera viewing position (or focus) or view position of the operator 101 changes, the position and/or type of visual indicators will also change as shown in FIGS. 3A-3C as described above, for example.

It should be appreciated that the systems and methods described herein can be used for a robust number of applications. For example, the disclosed systems can be implemented for finding a presenter in a large crowd. In this case, the presenter may transmit his or her GPS-location to the production camera 120 using conventional GP transmission protocols. Upon receiving the GPS information, the camera 120 can be configured to generate a visual indicator (similar to the visual indicators described above) that can show the camera operator 101 where the presenter is located within the crowd. Effectively, the presenter can be easily and quickly found by the camera operator using the visual indicator even when the presented is in the middle of a crowd of millions of people. Advantageously, this implementation of the disclosed system is ideal for both live broadcast equipment, as well as for so-called EFP/ENG like productions with camcorders instead of multi-camera production equipment.

FIG. 6 illustrates a flowchart for a method for augmented video production workflow according to a refinement of the exemplary aspect. It should be appreciated that the method 600 as shown may continue from method 500 described above. In particular, at step 605, a display device 110 of a user 101 may receive frame data from a camera 120 and generate and overlay (e.g., indicated by dashed rectangle 210A) on the display device 110 so that the user knows the framing of the camera (e.g., camera 120A). Next, at step 610, the display device may receive frame data from one or more additional cameras (e.g., camera 120B) and generate a second overlay (e.g., overlay 210B) at step 615, as described above. Finally, using the two (or more) overlays on the display device 110, the camera operator 101 can select the particular camera with the best field of view, zoom level, angle, etc., for video production. In other words, the camera operator 101 can then use the visual information from display device 110, to judge if the position of another camera (e.g., camera 120B) is already capturing the same (or overlapping) live scene and/or is in a better position to shoot the respective action of the scene. For example, referring again to the example shown in FIG. 3B, if the camera operator 101 decides a close-up view of the pitcher is needed, the camera operator 101 may select the camera associated with the field of view 210B, which has a better zoom level in this regard than the camera providing the framing 210A.

Finally, at step 615, the video stream of the selected camera can be transmitted the video production environment for video editing, production, distribution, etc. Although not described in detail herein, the video production environment can be a video production truck, a video production control center, or the like, that includes production switches, controllers, processors, timing modules, a codec, and other equipment provided to process the incoming media streams for a television broadcast production. Such systems are generally known to those skilled in the art and will not be described in detail.

Moreover, another implementation would enable the camera operator 101 to easily and quickly follow a moving object, such as a person, bicycle, or the like, even if the object is not visible at that specific moment. As such, a shot can be framed where the moving object is tracked, while a building is blocking a direct view. The director can cut to this signal moments before the bike becomes visible (e.g., when it comes around the corner from the building) and appears into the actual image in full focus. Thus, in one aspect, the moving object may include an electronic device (e.g., a smartphone, running watch, etc.) that is configured to transmit GPS information to the display device 110. This GPS information may then be used to create a visual indicator that is presented to the user (e.g., as an electronic dot, circle, arrow, etc.) within the operator's real world field of view. Thus, even if the operator cannot see the moving object, the operator knows the object's location relative within his or her field of view. Thus, the operator will know the precise moment when the object will become visible and be prepared to direct the camera 120 to this location with the readiness to begin moving the camera and following the object as it becomes visible. It should be appreciated that other implementations can be implemented using the disclosed systems and methods.

Thus, while aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

The claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. A system for augmented video production workflow, the system comprising:
   a plurality of video production cameras each configured to capture a video frame and to generate respective video frame data and object identification data relating to at least one in focus object identified within the video frame captured by each video production camera;
   a display device wearable by a user, the display device including:
      a camera configured to capture a field of view data corresponding to a field of view of the user,
      a data image comparator configured compare the video frame data from each of the video production cameras with the field of view data captured by the camera and generate a plurality of first visual indicators for each respective video frame and at least one second visual indicator for the identified at least one in focus object,
      an overlay generator configured to concurrently generate a plurality of first overlays for the plurality of first visual indicators for the video frame and at least one second overlay for the at least one second visual indicator for the identified at least one in focus object, and
      a display having a clear lens enabling the user to see the field of view and configured to display the first and second overlays in the clear lens, such that the clear lens is configured to concurrently display the visual indicators of the video frame and the identified at least one in focus object that as the first and second overlays within the field of view of the user,
   wherein each of the plurality of video production cameras are configured to capture the video frame for a live scene from different viewing angles of the at least one in focus object in the live scene,
   wherein the clear lens of the display is configured to concurrently display the plurality of first overlays so that the video frame data generated by each of the plurality of video production cameras is concurrently framed relative to the field of view data captured by the camera of the display device, and
   wherein at least a part of the plurality of first overlays overlap with each other when displayed on the clear lens of the display device, and a video production controller configured to receive a user input to select and control one of the video production cameras to transmit a video stream including the video frame data generated by the selected video production camera to a video production environment such that a video production is generated using the video frame data corresponding to the first overlay of the respective selected and controlled video production camera based on the user input.

2. The system according to claim 1, wherein at least one of the display device and the camera includes an interface configured to receive the user input to select the one video production camera to provide content captured by the selected video production camera for video production.

3. The system according to claim 1, wherein the overlay generator is further configured to generate the plurality of first overlays for the respective video frames captured by the plurality of video production cameras and the second overlay for the identified at least one in focus object, such that the second overlay is displayed as a visual indicator within at least one of the plurality of first overlays.

4. The system according to claim 1, wherein the display device is a pair of glasses wearable by the user, that includes at least one frame having a user field of view when worn by the user that corresponds to the field of view captured by the second camera.

5. The system according to claim 1, wherein the data image comparator is further configured compare the video frame data from the plurality of video production cameras with the field of view data captured by the camera and to update a position for the first and second visual indicators in the clear lens upon detecting changes to any of the video frame data, the object identification data and the field of view data.

6. A system for augmented video production workflow, the system comprising:
   a plurality of first cameras configured to generate respective video frame data corresponding to captured video frames by each of the first cameras; and
   a display device wearable by a user, the display device including:
      a second camera configured to capture a field of view data,
      a data image comparator configured to compare the video frame data generated by each of the first cameras with the field of view data captured by the second camera,
      an overlay generator configured to generate a plurality of first visual indicators for the captured video frames based on the comparison between the respective video frame data and the field of view data; and
      a display configured to concurrently display the plurality of first visual indicators corresponding to the video frame captured by the first camera,
      wherein each of the plurality of first cameras are configured to capture the video frames for a live scene from different viewing angles of the live scene,
      wherein the display is configured to concurrently display the plurality of first visual indicators so that the video frame data generated by each of the plurality of first cameras is concurrently framed relative to the field of view data captured by the second camera; and
   a video production controller configured to receive a user input to select and control one of the first cameras to transmit a video stream including the video frame data generated by the selected first camera to a video production environment such that a video production is generated using the video frame data corresponding to the respective first visual indicator of the respective selected and controlled first camera based on the user input.

7. The system according to claim 6, wherein the display device is a pair of glasses wearable by the user, and the display includes at least one frame having a user field of view when worn by the user that corresponds to the field of view captured by the second camera.

8. The system according to claim 6, wherein the plurality of first cameras are further configured to generate object identification data relating to at least one object within the video frame that is determined by at least one of the first cameras to be in focus, and wherein the overlay generator configured to generate a second visual indicator for the identified at least one in focus object.

9. The system according to claim 8, wherein the overlay generator is further configured to generate a plurality of first overlays for the video frame captured by the plurality of first cameras and a second overlay for the at least one object, such that the second overlay is displayed as a visual indicator within the plurality of first overlays on the display of the display device.

10. The system according to claim 6, wherein at least one of the display device and the second camera includes an interface configured to receive the user input to select one of the first cameras to provide content captured by the selected first video production camera to the video production environment for video production.

11. The system according to claim 6, wherein the data image comparator is further configured compare the video frame data from the plurality of first cameras with the field of view data captured by the second camera and to update a position for the plurality of first visual indicators to be displayed in the display of the display device upon detecting a change to the generated video frame data and the captured field of view data.

12. The system according to claim 6, wherein at least a part of the plurality of first visual indicators overlap with each other when concurrently displayed on the display of the display device.

13. A display device for augmented media content capture, the display device comprising:
   a camera configured to generate field of view data corresponding to a field of view of a user wearing the display device;
   an overlay generator configured to generate a plurality of visual indicators for respective video frames captured by a plurality of media content capture cameras communicatively coupled to the display device: and
   a display including the field of view of the user and configured to concurrently display the generated plurality of visual indicators at least partially within the field of view of the user, with the at least a part of the plurality of visual indicators overlapping each other when concurrently displayed on the display.

14. The display device according to claim 13, further comprising a data image comparator configured to compare the generated field of view data with the respective video frames captured by the plurality of media content capture cameras.

15. The display device according to claim 14, wherein the overlay generator is further configured to generate the plurality of visual indicators for the respective video frames based on the comparison between the respective captured video frames and the generated field of view data.

16. The display device to claim 13, wherein the display device is a pair of glasses wearable by the user, and the display includes at least one frame including the field of view when worn by the user that corresponds to the field of view captured by the camera.

17. The display device according to claim 13, wherein the overlay generator is further configured to generate an object visual indicator for at least one in focus object in the respective video frames.

18. The display device according to claim 17, wherein the overlay generator is further configured to generate the plurality of visual indicators as a plurality of first overlays for the respective video frames captured by the media content capture cameras and the object visual indicator as a second overlay for the at least one in focus object, such that the second overlay is displayed within the plurality of first overlays on the display of the display device.

19. The display device according to claim 18, further comprising a video production controller configured to receive a user input to select and control one of the plurality of media content capture cameras to transmit a video stream including the respective video frames captured by the selected media content capture camera to a video production environment such that a video production is generated using the transmitted video stream corresponding to the respective first overlay of the respective selected and controlled first media content capture camera based on the user input.

20. The display device according to claim 13, wherein the overlay generator is further configured to update a position for at least one of the plurality of visual indicators to be displayed in the display of the display device upon detecting a change to at least one of the captured video frames and the generated field of view data.

* * * * *